Dec. 22, 1970 CHONG Y. YOON 3,549,332
COUNTERCURRENT LIQUID-LIQUID EXTRACTION DEVICE
Filed Jan. 13, 1969 2 Sheets-Sheet 2

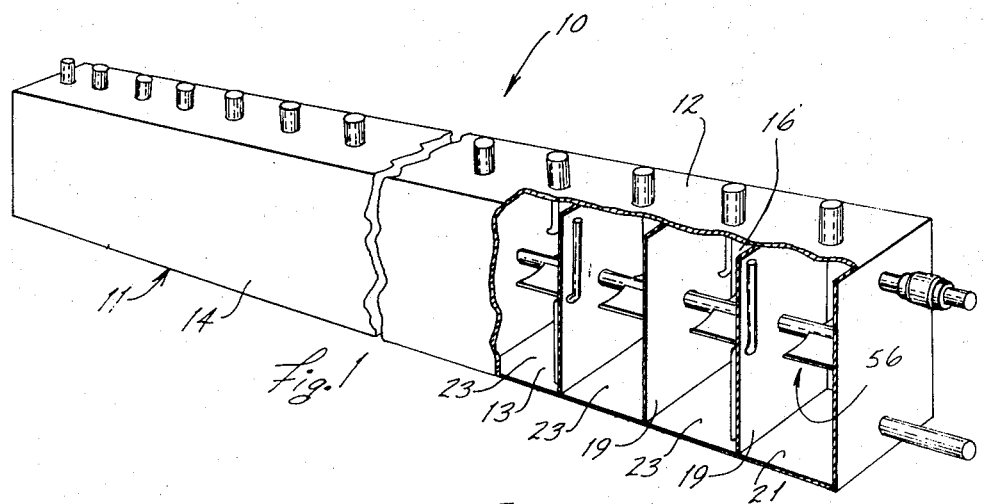
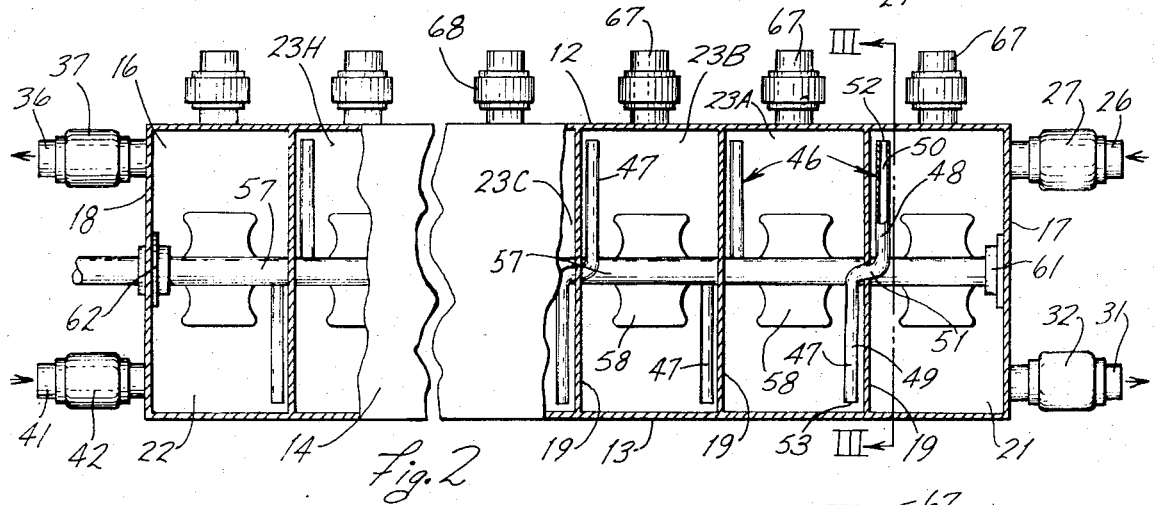
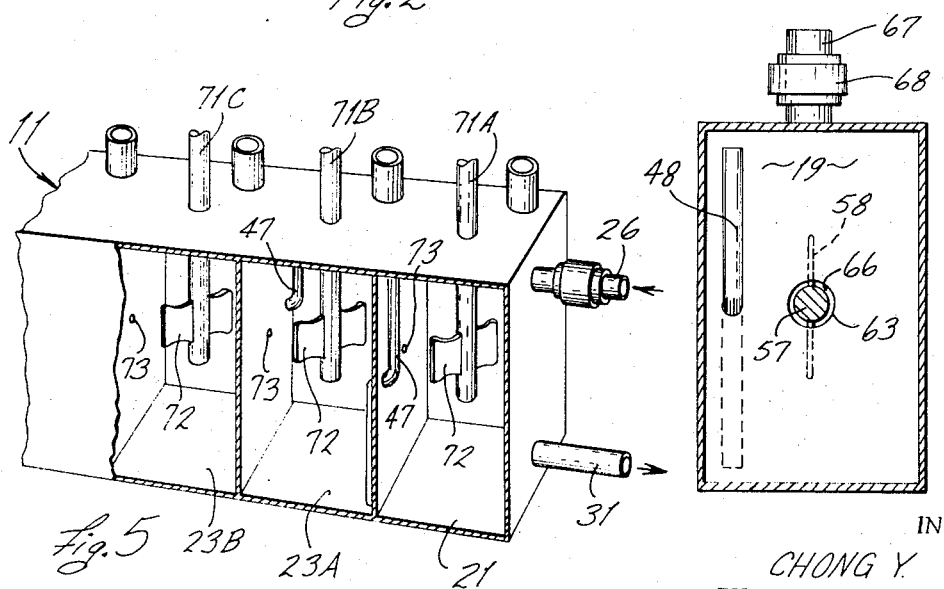
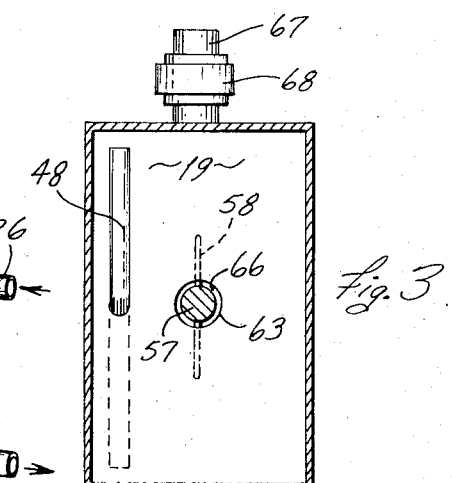

INVENTOR.
CHONG Y. YOON
BY
Woodhams, Blanchard & Flynn
ATTORNEYS

3,549,332
**COUNTERCURRENT LIQUID-LIQUID
EXTRACTION DEVICE**
Chong Y. Yoon, Kalamazoo, Mich., assignor to The
 Upjohn Company, Kalamazoo, Mich., a corporation
 of Delaware
Filed Jan. 13, 1969, Ser. No. 790,770
Int. Cl. B01d *11/04*
U.S. Cl. 23—270.5     10 Claims

ABSTRACT OF THE DISCLOSURE

A process and an apparatus for the extraction of one or more components from a first liquid phase of one specific gravity by contacting same with a second liquid phase of a different specific gravity. A tank is provided having a plurality of adjacent closed compartments with an upper portion of each compartment being in communication with a lower portion of the next adjacent compartment by a transfer conduit. Each compartment contains agitator means therein and communicates with adjacent compartments by a small weep opening. Each of the compartments is supplied with predetermined quantities of said first and second liquid phases. The liquid quantities in each of the compartments are agitated and then allowed to settle. A pressurized quantity of one liquid is then supplied to one end compartment whereupon the corresponding liquid within the remaining compartments is caused to flow through the transfer conduits into one of the upper or lower portions of each respectively next adjacent compartment and comes into contact with the other liquid. This causes an equal volume of the corresponding liquid to be discharged from the compartment at the opposite end. The liquid body is again agitated and permitted to settle, whereupon a quantity of the other corresponding liquid is supplied to the other end compartment whereupon such liquid within the remaining compartments is caused to flow through the transfer conduits into the other of the upper or lower portions of the next respectively adjacent compartment, causing an equal volume of the other corresponding liquid to be discharged from said one end compartment. The liquid is then again agitated and permitted to settle and a new quantity of pressurized first liquid is again supplied to the one end compartment.

FIELD OF THE INVENTION

This invention relates generally to a process and an apparatus for producing countercurrent contact between two substantially immiscible liquids having different densities, and more particularly to a process and an apparatus for carrying out a multistage countercurrent contact of two immiscible, or substantially immiscible, liquids of different densities for such purposes as withdrawing one or more components from one liquid by contacting it with another liquid as, for example, in washing or in fractional extraction operations.

BACKGROUND OF THE INVENTION

Processes and devices for the separation of mixtures by continuous countercurrent distribution are known whereby two liquid phases which are immiscible or miscible only to a limited degree and which are of different specific gravities are brought into contact with one another in a countercurrent manner. A conventional and well-known apparatus for performing such a countercurrent contact of two liquids, commonly referred to as a mixer-settler, provides a plurality of alternately spaced mixing and separating compartments connected in series. In this device, the liquids are mixed in a mixing compartment and are then conveyed to a settling compartment for permitting separation to occur, whereupon the liquids are then supplied to the next mixing compartment with the mixing and settling steps again being repeated. While this mixer-settler device performs in an acceptable manner, it is undesirable from an economic standpoint because the agitated tanks are expensive and the necessary interstage pumping facilities further add to the cost. Further, these devices are unnecessarily bulky and space-consuming since they generally require the use of a large number of stages with each stage requiring independent mixing and settling compartments.

Attempts have been made to simplify the bulky structure of conventional mixer-settlers by utilizing sloped pipes for conncting the adjacent mixing tanks, which sloped pipes permit settling to occur between the adjacent mixing tanks and thereby eliminate the need for separate settling compartments positioned intermediate the mixing tanks. However, these devices have not substantially simplified the overall structure since such pipes require nearly as much space as the intermediate separating compartments in order to perform a complete and efficient separation of the two liquids.

Accordingly, it is an object of this invention:

(1) To provide an improved countercurrent liquid-liquid extraction process and apparatus.

(2) To provide an apparatus, as aforesaid, having a plurality of adjacent horizontal compartments with each compartment being used both as a mixing and a separating chamber.

(3) To provide an apparatus, as aforesaid, wherein adjacent compartments are interconnected by fluid transfer means which efficiently permits transfer of liquids from one compartment to the next compartment with little back mixing and permits intermittent operation without risk of interstage leakage.

(4) To provide an apparatus, as aforesaid, wherein small weep openings are provided between adjacent compartments to permit the level of the light and heavy liquids within the plurality of compartments to be easily controlled.

(5) To provide an apparatus, as aforesaid, wherein the light liquid is caused to flow from the upper portion of one compartment into the lower portion of an adjacent compartment and the heavy liquid is caused to flow from the lower portion of one compartment into the upper portion of an adjacent compartment, the light and heavy liquids intermittently flowing in opposite directions.

(6) To provide an apparatus, as aforesaid, which is simple in design, inexpensive to manufacture, substantially free of maintenance and offers high stage efficiencies and throughput rates.

(7) To provide a process, as aforesaid, wherein predetermined quantities of light and heavy liquids within a compartment are mixed and then allowed to separate with the separated light liquid in the upper portion of the compartment being forcibly displaced into the lower portion of an adjacent compartment.

(8) To provide a process, as aforesaid, wherein the light and heavy liquids are again mixed and then permitted to separate with the heavy fluid in the lower portion of one compartment being positively displaced into the upper portion of an adjacent compartment.

(9) To provide a process, as aforesaid, wherein quantities of light and heavy liquid are alternately forced to flow in opposite directions sequentially from one compartment into an adjacent compartment.

(10) To provide a process, as aforesaid, which is simple and offers high stage efficiencies and throughput rates.

Other objects and purposes of this invention will be apparent to persons acquainted with processes and apparatuses of this general type upon reading the following specification and inspecting the accompanying drawings.

BRIEF DESCRIPTION OF THE DRAWINGS

FIG. 1 is a perspective view of a multistage countercurrent liquid-liquid extraction apparatus.

FIG. 2 is a broken, partial sectional side elevational view of the apparatus illustrated in FIG. 1.

FIG. 3 is a cross-sectional view taken along the line III–III of FIG. 2.

FIG. 5 is a broken perspective view of a modified extraction apparatus.

Figure 4:
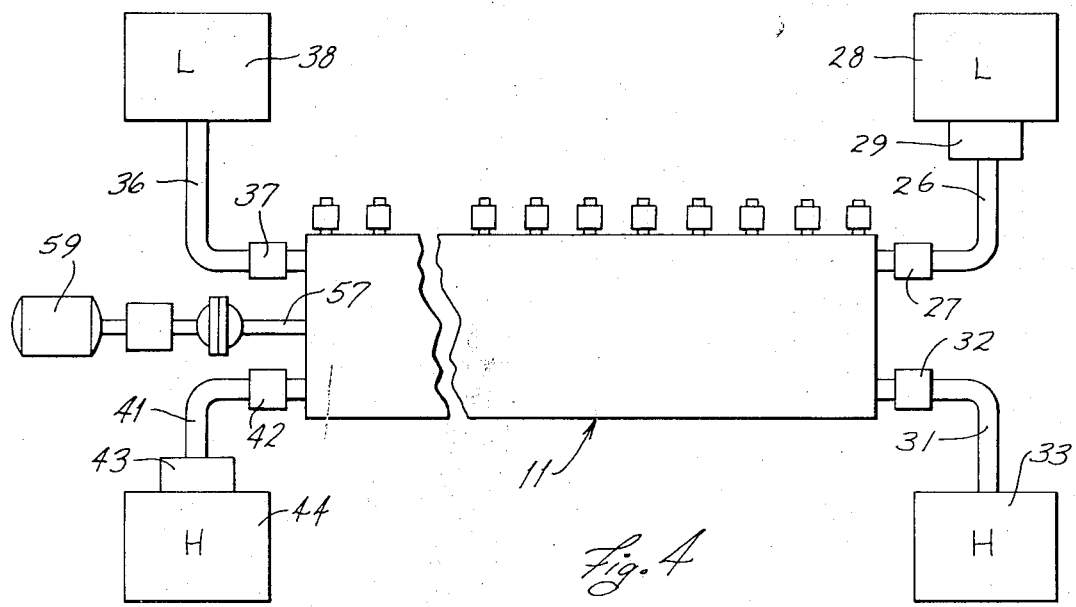
FIG. 4 is a diagrammatic illustration of an overall system incorporating therein the extraction apparatus of FIG. 1.

Certain terminology will be used in the following description for convenience in reference only and will not be limiting. The words "upwardly," "downwardly," "rightwardly" and "leftwardly" will designate directions in the drawings to which reference is made. The word "forwardly" will refer to the normal direction of liquid flow through the device. The words "inwardly" and "outwardly" will refer to directions toward and away from, respectively, the geometric center of the device and designated parts thereof. Said terminology will include the words above specifically mentioned, derivatives thereof and words of similar import.

SUMMARY OF THE INVENTION

The objects and purposes of this invention are met by providing an apparatus having a plurality of substantially closed compartments connected in series by fluid transfer conduits which provide communication between the upper portion of each compartment and the lower portion of an adjacent compartment. The apparatus is provided with inlet and outlet connections at each end thereof for permitting the counterflow of light and heavy liquids therethrough. The plurality of compartments are provided with a small weep opening therebetween to maintain substantially equal quantities of light and heavy liquids within each of the compartments. Agitating means are provided within each of the compartments, preferably by means of a single drive shaft extending longitudinally of the apparatus and having impeller blades thereon, for permitting simultaneous agitation and mixing of the light and heavy liquids within each compartment. The flow conduits connecting adjacent compartments have an area substantially larger than the area of the weep opening whereby pressurization of the fluid within one compartment causes one of the liquids to flow through the flow conduit into the next adjacent compartment.

The process involved in operating the above-described apparatus first comprises filling each of the compartments with substantially equal quantities of light and heavy, at least substantially immiscible, liquids with the liquid in each compartment then being mixed to cause intimate contact between the two liquids. The liquid within each compartment is then allowed to settle with the light liquid rising to the top of the compartment and the heavy liquid settling to the bottom of the compartment, the interface area between the light and heavy liquids being substantially at the level of the weep opening connecting adjacent compartments. A predetermined quantity of one of the liquids, such as the light liquid, is then forced into an end compartment of the apparatus whereupon the light liquid already in the end compartment is caused to flow downwardly through the flow conduit into the next adjacent compartment whereupon the light liquid is discharged into the lower portion of the adjacent compartment and thus bubbles upwardly through the heavy liquid, thereby achieving an intimate contact and mixing of the two liquids. The liquid within the compartments is again mixed and permitted to separate, whereupon a predetermined quantity of the other liquid, such as the heavy liquid, is then admitted into the other end compartment of the apparatus whereupon the heavy liquid in the end compartment is caused to flow in the opposite direction upwardly through the flow conduit and is discharged into the upper portion of the next compartment whereupon same then bubbles downwardly through the light liquid. The above process is then sequentially repeated with the light and heavy liquids being alternately displaced in opposite directions from compartment to compartment whereby through contact and mixing of the two liquids occur, resulting in efficient extraction of one or more components from one of the liquids by the other liquid.

DETAILED DESCRIPTION

FIG. 1 illustrates a countercurernt liquid-liquid extraction apparatus 10 according to the present invention which comprises a substantially closed tank 11 having parallel top and bottom walls 12 and 13 connected by substantial parallel sidewalls 14 and 16. The opposite ends of the tank 11 are closed by end walls 17 and 18 (FIG. 2) and the tank is further divided into a plurality of substantially identical closed compartments by means of internal partitions 19. The partitions 19 divide the tank 11 into end compartments 21 and 22 and a plurality of substantially identical intermediate compartments 23, said intermediate compartments being designated as 23A, 23B, 23C, etc. in FIG. 2.

The end wall 17 is provided with a light liquid inlet pipe 26 secured thereto and communicating with the upper portion of the end compartment 21, while a similar heavy liquid outlet pipe 31 is secured to the end wall 17 and communicates with the end compartment 21 adjacent the bottom region thereof. As illustrated in FIG. 4, the light liquid inlet pipe has a regulating valve means 27 therein with the flow of liquid through the pipe 26 being controlled by a conventional pump means 29 supplied with liquid from any conventional source, such as a light liquid reservoir 28. Similarly, the heavy liquid outlet pipe 31 contains a regulating valve means 32 therein for controlling the flow of heavy liquid to a heavy liquid storage tank 33.

The other end of the tank 11 is provided with a light liquid outlet pipe 36 (FIG. 2) and a heavy liquid inlet pipe 41 in communication with the upper and lower portions of the end compartment 22, respectively. The light liquid outlet pipe 36 contains a regulating valve means 37 for controlling flow of light liquid to the light liquid storage tank 38 (FIG. 4). Similarly, the heavy liquid inlet pipe 41 contains a regulating valve means 42 therein for controlling flow of heavy liquid into the end compartment 22, the heavy liquid being supplied from any conventional source, such as a storage reservoir 44, by a conventional pump means 43. The pumps 29 and 43 thus supply light and heavy liquids, respectively, to the end compartments 21 and 22, respectively, whereby the light and heavy liquids flow through the plurality of intermediate compartments 23 in substantially opposite directions with the light and heavy liquids then being conveyed from the tank 11 by means of the outlet pipes 36 and 31, respectively.

To permit the flow of light and heavy liquids between the adjacent tank compartments, there is provided a flow transfer means 46 (FIG. 2) which comprises a plurality of identical, substantially Z-shaped tubular members 47 each having a flow passage 50 extending longitudinally therethrough. Each member 47 has upper and lower vertical legs 48 and 49 positioned on opposite sides of the partition 19 with the vertical legs being connected by a bridge portion 51 which extends through the partition and is mounted in sealing relationship thereto. The upper vertical leg 48 is provided with an opening 52 in the upper end thereof, which opening is in communication with the upper portion of one compartment, while the lower vertical leg is provided with a similar opening 53 in the lower end thereof which is in communication with the lower portion of an adjacent compartment whereby liquid can flow between the upper and lower portions of adjacent compartments through each of said passages 50.

Figure 6:
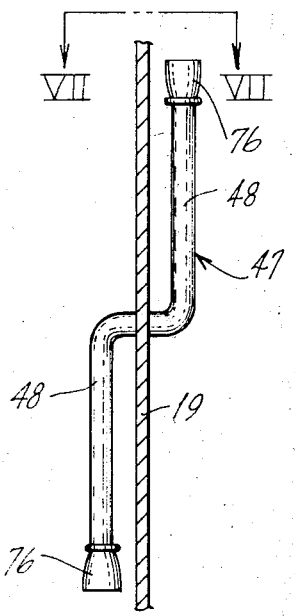
FIG. 6 is a broken sectional view of a modification of the flow transfer means connecting adjacent compartments.
Figure 7:
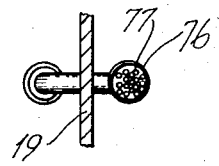
FIG. 7 is a top view taken along the line VII–VII of FIG. 6.

The upper and lower ends of the tubular member 47 can, as illustrated in FIGS. 6 and 7, be provided with perforated dispensers 76 thereon, which perforated dispensers 76 contain a plurality of small openings 77 therein. The use of such perforated dispensers causes the liquid discharged from the tubular member 47 to be separated into a plurality of small streams or particles which then bubble upwardly (or downwardly) through the compartment, the small size of the particles substantially increasing the ultimate contact between the light and heavy liquids, thereby substantially increasing the separation efficiency of the device.

As illustrated in FIGS. 1 and 2, the tubular members 47 are preferably alternately positioned adjacent the opposite sidewalls 14 and 16 whereby the liquid flowing from one compartment to another compartment has to travel substantially diagonally across the individual compartments.

To permit the liquids within the individual compartments to be mixed, the extraction apparatus 10 is preferably provided with agitation means, indicated generally at 56, which includes a single continuous drive shaft 57 extending through all of the compartments and having blades 58 secured thereto and positioned within each of the compartments for agitating and mixing the liquids contained within the individual compartments. One end of the drive shaft 57 is connected to any suitable drive means 59 (FIG. 4), such as a motor and gear reducer unit.

The drive shaft 57 is supported in the opposite end walls 17 and 18 of the tank by means of sealed bearing units 61 and 62 (FIG. 2) with the drive shaft 57 extending through the sealed bearing unit 62 so as to be connectible to the drive means 59. Further, the intermediate partitions 19 are each provided with coaxial openings 63 (FIG. 3) therein for permitting the drive shaft 57 to pass through the partitions 19 and extend throughout the length of the tank 11. The openings 63 preferably have a diameter slightly larger than the external diameter of the drive shaft 57 so as to define an annular clearance space 66 therebetween, which space functions as a weep opening for permitting limited flow and communication between adjacent compartments for a purpose to be explained hereinafter. The openings 63 are also preferably substantially centrally positioned within the partitions 19.

While FIG. 3 illustrates the annular clearance space 66 as being rather large, same has been illustrated in this manner merely for convenience in illustration since, in the actual apparatus, the area of the clearance space 66 is substantially smaller than the cross-sectional flow area of the passage 50 within the tubular flow members 47. For example, the cross-sectional area of the flow passage 50 within the tubular member 47 is at least approximately three times larger than the area of the annular space 66 and preferably is approximately twenty (20) times larger.

The tank 11 is further provided with a plurality of auxiliary pipes 67 in communication with the individual compartments therein. Each of the auxiliary pipes 67 contain a regulating valve means 68 for controlling the flow of whatever material, liquid or gaseous, is ti be conveyed through the pipes.

OPERATION

The operation of the device embodying the invention will be described hereinbelow for a better understanding of the apparatus and process comprising the present invention.

The device embodying the invention permits the separation of one or more components from a first liquid phase by the countercurrent action of a second liquid phase which is immiscible or substantially immiscible with the first liquid phase. The tank 11 is initially filled with the two liquids, one of the liquids being substantially heavier than the other liquid. For example, the individual compartments can be filled by means of the auxiliary pipes 67 if desired with the valve means 68 then being closed so as to close off the individual compartments after filling. If it is desired to add the feed at a point between the two end compartments, the feed either by itself or as a solution in one of the liquid phases may be introduced by means of the auxiliary pipes 67. Further, all of the intermediate compartments 23 preferably contain therein predetermined quantities of light and heavy liquids. In the apparatus illustrated in FIG. 2, wherein the weep opening 66 is centrally positioned within the partitions 19, each of the compartments 23 preferably contains approximately equal quantities of light and heavy liquids such that the interface between the two liquids is substantially in a horizontal plane passing through the longitudinally extending axis of the aligned clearance spaces 66.

Drive shaft 57, if used, is then rotated so as to rotate the agitator blades 58 whereupon the light and heavy liquids within the individual compartments are thoroughly mixed so as to come into contact with one another, whereupon the drive shaft 57 is then stopped so as to permit the heavy iquid to settle to the bottom half of the compartments while the light liquid rises to the upper half of the individual compartments. During this stage of the process, the valve means 27, 32, 37 and 42 on the inlet and outlet pipes in communication with the end chambers 21 and 22 are maintained in the closed position.

After the fluid in the individual compartments has been allowed to separate, the light liquid valve means 27 and 37 are opened and a predetermined quantity of light liquid is supplied by the pump 29 to the end compartment 21, which end compartment is substantially closed except for the weep opening 66 and the passageway 50 contained within the tubular member 47. The predetermined quantity of light liquid supplied to the end compartment 21 simultaneously forces the light liquid in the upper portion of the end compartment 21 to flow downwardly through the tubular member 47 into the adjacent intermediate compartment 23A with the light liquid entering the adjacent compartment 23A through the opening 53 located adjacent the bottom of the compartment. Since the lower portion of compartment 23A contains heavy liquid therein, the light liquid flowing into the lower portion of compartment 23A comes into intimate contact with the heavy liquid as it rises upwardly due to gravity into the upper portion of the compartment.

Similarly, the light liquid contained within the upper portion of the compartment 23A is simultaneously forced downwardly through the tubular member 47 into the lower portion of the next adjacent compartment 23B.

This process is simultaneously repeated throughout the series of intermediate compartments until a predetermined quantity of light liquid is forced out of the upper portion of the end compartment 22 through the outlet pipe 36 into the storage tank 38.

After the predetermined quantity of light liquid has been supplied to the end compartment 21, the valves 27 and 37 on the light liquid pipe lines are closed so as to seal off the tank, whereupon the drive shaft 57 is again rotated so as to mix the light and heavy liquids contained within the individual compartments. The drive shaft is then stopped to permit the individual liquids to separate in the same manner as previously described. The valve means 32 and 42 in the heavy liquid pipe lines are then opened and a predetermined quantity of heavy liquid, which may or may not be the same quantity as selected for the light liquid, is supplied by the pump 43 to the end compartment 22, which in turn causes the heavy liquid within the compartment 22 to be pressurized and forced upwardly through the tubular member 47 into the upper portion of the next adjacent chamber 23H whereupon the heavy liquid then settles downwardly through the light liquid contained adjacent the upper portion of the compartment 23H. Similarly, the heavy liquid adjacent the lower portion of the compartment 23H is simultaneously forced upwardly through the next tubular member 47 into the upper portion of the next compartment. This process thus continues simultaneously throughout the series of compartments until a predetermined quantity of heavy liquid is forced outwardly from the end compartment 21 through the outlet pipe 31 into the heavy liquid storage tank 33.

The valve members 32 and 42 are then closed and the drive shaft 57 is again rotated so as to mix the liquids within the individual compartments, whereupon the liquids within the individual compartments are again permitted to separate. The valves 27 and 37 are again opened and a predetermined quantity of light liquid is again supplied to the upper portion of the end compartment 21 whereupon the above-described sequence is again repeated.

In the above-described manner, predetermined quantities of light and heavy liquids are alternately supplied to the opposite ends of the tank 11, which in turn causes the alternate and sequential flow of light and heavy liquids from compartment to compartment in substantially opposite directions.

During the performance of the above process, the majority of the light or heavy liquid transferred between adjacent compartments is forced to flow through the tubular members 47 since the cross-sectional area of the passage 50 contained therein is substantially larger than the area of the clearance space 66. However, the clearance space 66 does provide for limited flow of liquid between adjacent compartments so as to maintain a substantially equal quantity of heavy and light liquid within each of the intermediate compartments 23. The weep openings 66 thus substantially function as a level maintaining device by permitting limited flow of light and/or heavy liquid between adjacent compartments such that the interface between the light and heavy liquids within the intermediate compartments 23 defines a single horizontal plane passing substantially through the centers of the coaxially aligned weep openings 66.

In summary, the process as explained in detail above thus basically comprises six steps, which six steps are sequentially repeated. First, the two liquid phases within the individual compartments are agitated so as to mix same. Second, the agitators are stopped so as to permit the two liquid phases to settle and separate. Thirdly, one of the liquid phases is transferred in a series-like manner from compartment to compartment. Fourthly, the two liquid phases within the individual compartments are again mixed by means of an agitator. Fifthly, the agitator is again stopped and the two liquid phases are allowed to separate. Lastly, the other liquid phase is then transferred in series from compartment to compartment in a direction opposite the transfer direction of the one liquid phase.

The apparatus according to the present invention thus not only results in a desirable extraction process as explained above but it further results in many additional desirable operation advantages. For example, the horizontal orientation of the series of compartments makes it possible to maintain a common horizontal liquid interface throughout the entire length of the intermediate compartments. This thus simplifies the overall operation of the apparatus since the light and heavy liquids can be transferred from one compartment to the next compartment merely by opening the appropriate inlet and outlet pipes so as to cause a predetermined quantity of liquid to sequentially move from stage to stage throughout the apparatus.

Further, the simple Z-shaped tubular flow members 47 which connect the heavy phase liquid in one compartment to the light phase liquid in the next adjacent compartment serves a dual purpose, functioning not only to transfer the liquid in the desired direction, but also functioning as an internal check valve to prevent the liquid phases from moving in the wrong direction. For example, the position of the upper and lower ends of the tubular flow members 47 prevent the heavy liquid from flowing in the wrong direction, that is, leftwardly in FIG. 2, while simultaneously it prevents light liquid from also flowing in the wrong direction, that is, rightwardly in FIG. 2.

A still further manner in which the apparatus of the present invention can be operated permits solid feed components to be introduced into the individual compartments through the auxiliary pipes 67 in any desired manner and at any desired location.

While the device is preferably operated in a cyclic manner as explained above, it will be apparent that the device can be made to operate in a continuous manner if desired by continually supplying light and heavy liquids to the opposite end of the tank rather than intermittently supplying the light and heavy liquids as explained above. That is, a predetermined quantity of light liquid can be supplied to one end of the tank and, immediately following same, a predetermined quantity of heavy liquid can be supplied to the other end of the tank, again followed by the supplying of a predetermined quantity of light liquid to the first end of the tank. Thus, while the light and heavy liquids are alternately supplied to opposite ends of the tank, the tank is continually supplied with liquid. Since the supply of liquid in this mode of operation is not cyclic or intermittent as in the above-described operation, it is necessary in this mode of operation to provide agitator blades only in every other compartment with the intermediate compartments being used as settling chambers. While the apparatus of this invention can be operated in this manner, operation in a cyclic manner is preferred since a much greater stage efficiency is thus obtained.

MODIFICATION

FIG. 5 illustrates therein a portion of a tank which is similar to the tank illustrated in FIGS. 1 and 2 but utilizes a slightly modified structure. The parts and components of the tank illustrated in FIG. 5 which are identical to the corresponding parts of the tank illustrated in FIG. 1 have been designated with like reference numerals.

The tank illustrated in FIG. 5 is substantially similar to the tank illustrated in FIG. 1 and contains a plurality of compartments interconnected by Z-shaped flow transfer members 47. Further, each of the compartments contains therein an agitation device. However, instead of utilizing a single through drive shaft as illustrated in FIG. 2, the tank of FIG. 5 is provided with a plurality of substantially vertical drive shafts 71A, 71B, etc., extending through the upper wall of the tank and having blades 72 thereon positioned within the tank. The drive shafts 71 can be driven individually or can be interconnected by any suitable means, such as chains or gears, so as to permit the liquid within all of the compartments to be simultaneously agitated. Further, each of the intermediate partitions 19 is provided with a small weep opening 73 extending therethrough for permitting communication between the adjacent compartments, the weep opening 73 preferably being substantially centrally positioned of the partition 19. As explained above, the weep opening 73 has an area substantially less than the cross-sectional area of the passage contained within the flow transfer members 47. The operational process of the tank structure illustrated in FIG. 5 is identical to the operational process as explained above and accordingly no further explanation is believed necessary.

While particular preferred embodiments of the invention have been disclosed above for illustrative purposes, it will be understood that variations or modifications thereof which lie within the scope of the appended claims are fully contemplated.

The embodiments of the invention in which an exclusive property or privilege is claimed are defined as follows:

1. A countercurrent liquid-liquid extraction apparatus, comprising:
   tank means having substantially transversely extending vertical walls dividing said tank means into a plurality of closed compartments positioned adjacent one another in a horizontal side-by-side relationship and including first and second end compartments and a plurality of intermediate compartments;
   first inlet means communicating with said first end compartment for supplying a light liquid thereto;
   second inlet means communicating with said second end compartment for supplying a heavy liquid thereto;
   first outlet means communicating with said second end compartment for withdrawing said light liquid therefrom;
   second outlet means communicating with said first end compartment for withdrawing said heavy liquid therefrom;
   control means for alternatively (1) supplying said light liquid under pressure through said first inlet means into said first end compartment and (2) supplying said heavy liquid under pressure through said second inlet means into said second end compartment, whereby to effect a countercurrent alternative flow of said liquids through said compartments;
   an elongated tubular member connecting each pair of adjacent compartments, each said tubular member having an upper part disposed within the upper portion of one of said adjacent compartments, a lower part disposed within the lower portion of the other one of said adjacent compartments and an intermediate portion extending through the vertical wall between said adjacent compartments, said upper and lower parts being open so that liquid can flow through said tubular member between said adjacent compartments, the tubular members being arranged so that the light liquid flows downwardly therethrough and passes in succession from said first end compartment through said intermediate compartments to said second end compartment and the heavy liquid alternatively flows in the reverse direction in response to the operation of said control means;
   said vertical walls each having therethrough fluid flow opening means of substantially smaller cross-sectional area than the respective cross-sectional areas of their respective tubular members, said opening means providing direct communication between adjacent compartments for permitting limited flow of the liquids therebetween;
   said opening means being located vertically between the upper and lower parts of said tubular members so that the interface regions between said light and heavy liquids in said intermediate compartments are maintained at substantially the same vertical level and said level is located between said upper and lower parts of said tubular members.

2. An apparatus as defined in claim 1, wherein each said tubular member includes a substantially vertically extending upper part positioned within the upper portion of said one compartment and a substantially vertically extending lower part positioned within the lower portion of said other adjacent compartment, and said tubular member including a bridge portion fixedly mounted on and extending through said vertical wall between said adjacent compartments.

3. An apparatus as defined in claim 1, wherein said upper part of said elongated tubular member includes a substantially upwardly directed opening formed therein for providing communication between said tubular member and the upper portion of said one compartment, and said lower part of said tubular member further having a substantially downwardly directed opening formed therein for providing communication between said tubular member and the lower portion of said other adjacent compartment.

4. An apparatus as defined in claim 1, wherein the tubular member connecting each pair of adjacent compartments has a cross-sectional area at least approximately three times larger than the cross-sectional area of the fluid flow opening means connecting said pair of adjacent compartments.

5. An apparatus as defined in claim 4, wherein the tubular member has a cross-sectional area approximately twenty times larger than the cross-sectional area of the fluid flow opening means.

6. An apparatus as defined in claim 1, wherein said tubular members are alternately positioned adjacent the opposite longitudinal extending sidewalls of said tank means for causing the liquid flowing from one compartment to another compartment to travel substantially diagonally across the individual compartments.

7. An apparatus as defined in claim 1, further including mixing means positioned within at least some of said compartments for effecting agitation and mixing of the light and heavy liquids therein.

8. An apparatus as defined in claim 7, wherein said mixing means includes a horizontal drive shaft extending through a plurality of said compartments with said shaft having agitator blades secured thereto and positioned within at least some of said compartments;
   said vertical walls having openings through which said drive shaft extends with said drive shaft openings having a cross-sectional area slightly larger than the cross-sectional area of said drive shaft for defining clearance spaces, said clearance spaces constituting said fluid flow opening means for permitting limited flow of liquid between adjacent compartments so as to maintain the interface region between the light and heavy liquids in the adjacent intermediate compartments substantially at a uniform elevation.

9. An apparatus according to claim 1, in which said control means includes valve means associated with said inlet means and said outlet means for controlling the flow of liquids therethrough.

10. An apparatus according to claim 1, including valved material feed openings in the upper wall of said tank means and communicating with at least some of the compartments therein.

References Cited

UNITED STATES PATENTS 1,297,171    3/1919    Holley _____ 23—270.5

(Other references on following page)

UNITED STATES PATENTS

| | | | |
|---|---|---|---|
| 2,154,713 | 4/1939 | Wijk | 23—270.5X |
| 2,906,606 | 9/1959 | Signer | 23—270.5 |

FOREIGN PATENTS

| | | | |
|---|---|---|---|
| 54,123 | 7/1934 | Norway | 23—270.5 |
| 501,344 | 4/1954 | Canada | 22—270.5 |
| 654,949 | 1/1963 | Canada | 23—267 |
| 659,856 | 3/1963 | Canada | 23—267 |
| 885,503 | 12/1961 | Great Britain | 23—270.5 |

NORMAN YUDKOFF, Primary Examiner

S. J. EMERY, Assistant Examiner

U.S. Cl. X.R.

23—310; 196—14.52